United States Patent
Liu (10) Patent No.: US 11,816,875 B2
(45) Date of Patent: Nov. 14, 2023

(54) METHOD FOR ESTIMATING AND PRESENTING PASSENGER FLOW, SYSTEM, AND COMPUTER READABLE STORAGE MEDIUM

(71) Applicant: XI'AN ZHONGXING NEW SOFTWARE CO., LTD., Shaanxi (CN)

(72) Inventor: Ming Liu, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/630,499

(22) PCT Filed: Aug. 7, 2020

(86) PCT No.: PCT/CN2020/107975
§ 371 (c)(1),
(2) Date: Jan. 26, 2022

(87) PCT Pub. No.: WO2021/023310
PCT Pub. Date: Feb. 11, 2021

(65) Prior Publication Data
US 2022/0319168 A1  Oct. 6, 2022

(30) Foreign Application Priority Data
Aug. 7, 2019  (CN) .......................... 201910727332.2

(51) Int. Cl.
*G06V 40/10* (2022.01)
*G06V 10/82* (2022.01)
(Continued)

(52) U.S. Cl.
CPC .......... *G06V 10/255* (2022.01); *G06Q 50/30* (2013.01); *G06V 10/82* (2022.01); *G06V 20/41* (2022.01);
(Continued)

(58) Field of Classification Search
CPC ........ G06V 20/41; G06V 20/53; G06V 20/46; G06V 40/10; G06V 10/82
See application file for complete search history.

(56) References Cited

U.S. PATENT DOCUMENTS

2017/0286780 A1* 10/2017 Zhang .................... G06V 20/53
2018/0005071 A1*  1/2018 Idrees ................... G06V 10/435
(Continued)

FOREIGN PATENT DOCUMENTS

CN        102496058 A  *   6/2012
CN        102496058 A       6/2012
(Continued)

OTHER PUBLICATIONS

N. Dalal and B. Triggs, "Histograms of oriented gradients for human detection," 2005 IEEE Computer Society Conference on Computer Vision and Pattern Recognition (CVPR'05), San Diego, CA, USA, 2005, pp. 886-893 vol. 1, doi: 10.1109/CVPR.2005.177. (Year: 2005).*

(Continued)

*Primary Examiner* — Michael Robert Cammarata (57) ABSTRACT

A method for estimating and presenting a passenger flow, a system, and a computer storage medium. The method comprises: performing two-level scene classification on received on-site video data transmitted by a camera; configuring a passenger flow analysis algorithm corresponding to a scene according to a scene classification result; and analyzing a video frame according to the passenger flow analysis algorithm, outputting a passenger flow calculation result, determining, according to the passenger flow calculation result, a crowdedness level of a passenger flow at a location corresponding to the camera, and respectively transmitting the (Continued)

crowdedness level of the passenger flow to a first terminal and a second terminal for display of the crowdedness level of the passenger flow.

16 Claims, 5 Drawing Sheets

(51) Int. Cl.
  *G06V 10/20* (2022.01)
  *G06V 20/40* (2022.01)
  *G06V 20/52* (2022.01)
  *G06Q 50/30* (2012.01)
(52) U.S. Cl.
  CPC .............. *G06V 20/46* (2022.01); *G06V 20/53* (2022.01); *G06V 40/10* (2022.01)

(56) References Cited

U.S. PATENT DOCUMENTS

| | | | | |
|---|---|---|---|---|
| 2019/0206085 | A1* | 7/2019 | Jiang | G06V 10/454 |
| 2020/0193628 | A1* | 6/2020 | Chakraborty | G06V 20/58 |
| 2020/0349360 | A1* | 11/2020 | Genes | G06V 20/53 |
| 2021/0312170 | A1* | 10/2021 | Martinello | G06T 7/60 |
| 2022/0254161 | A1* | 8/2022 | Tatrai | G08B 31/00 |

FOREIGN PATENT DOCUMENTS

| | | | | | |
|---|---|---|---|---|---|
| CN | 102496058 | B | | 9/2014 | |
| CN | 107239762 | A | * | 10/2017 | ......... G06K 9/00778 |
| CN | 107330372 | A | * | 11/2017 | ......... G06K 9/00718 |
| CN | 108154089 | A | * | 6/2018 | ......... G06K 9/00778 |
| CN | 109815787 | A | | 5/2019 | |
| CN | 110059581 | A | | 7/2019 | |
| CN | 110059594 | A | | 7/2019 | |
| CN | 110147743 | A | * | 8/2019 | ......... G06K 9/00335 |
| CN | 110263619 | A | * | 9/2019 | ......... G06K 9/00718 |
| CN | 110516601 | A | * | 11/2019 | |
| CN | 108154089 | B | * | 7/2021 | ......... G06K 9/00778 |
| JP | 2004529356 | A | * | 9/2004 | |

OTHER PUBLICATIONS

K. Mikolajczyk, C. Schmid, and A. Zisserman. Human detection based on a probabilistic assembly of robust part detectors. The 8th ECCV, Prague, Czech Republic, vol. I, pp. 69-81, 2004. (Year: 2004).*
Sindagi V A, Patel V M. Generating high-quality crowd density maps us-ing contextual pyramid CNNs [C]//IEEE International Conference on Comput-er Vision. Venice, Italy, 2017. (Year: 2017).*
M. Li, Z. Zhang, K. Huang, and T. Tan. Estimating the number of people in crowded scenes by mid based foreground segmentation and head-shoulder detection. In Pattern Recognition, 2008. ICPR 2008. 19th International Conference on, (Year: 2008).*
T. Li, H. Chang, M. Wang, B. Ni, R. Hong, and S. Yan. Crowded scene analysis: A survey. IEEE Transactions on Circuits and Systems for Video Technology, 25(3):367-386, 2015. (Year: 2015).*
V. A. Sindagi and V. M. Patel. A survey of recent advances in cnn-based single image crowd counting and density estimation. Pattern Recognition Letters, 2017 (Year: 2017).*
X. Wang, S. Chen and H. Wei, "A passenger flow statistic algorithm based on machine learning," 2017 10th International Congress on Image and Signal Processing, BioMedical Engineering and Informatics (CISP-BMEI), Shanghai, China, 2017, pp. 1-5, doi: 10.1109/CISP-BMEI.2017.8302042. (Year: 2017).*
International search report of PCT Patent Application No. PCT/CN2020/107975 dated Nov. 10, 2020.
Extended European Search Report of Counterpart European Patent Application No. 20850349.0 dated Jun. 29, 2023.

* cited by examiner

METHOD FOR ESTIMATING AND PRESENTING PASSENGER FLOW, SYSTEM, AND COMPUTER READABLE STORAGE MEDIUM

CROSS-REFERENCE TO RELATED APPLICATION

This application claims the priority of Chinese patent application No. 201910727332.2, filed with the China National Intellectual Property Administration on Aug. 7, 2019, the entirety of which is incorporated herein by reference.

FIELD OF THE INVENTION

The present disclosure relates to, but is not limited to, the field of urban rail transit, and in particular, to a method for estimating and presenting a passenger flow, a system for estimating and presenting a passenger flow, and a non-transitory computer readable storage medium.

BACKGROUND OF THE INVENTION

In order to alleviate urban traffic congestion, more and more cities regard subway construction as the primary project, and at the same time, more and more people are willing to use the subway as their preferred public transportation. However, due to objective reasons such as explosive and unevenly distributed urban population in China, there are too many people waiting for the train at some stations, especially during rush hours. It is often the case that a large number of waiting passengers have gathered in the subway station, but passengers still enter the station continuously from outside to prepare to get on the train. As a result, there are increasing waiting passengers in the station, and people evacuation will not be performed smoothly, which not only prolongs the waiting time of the passengers but also brings hidden dangers of safety accidents such as crowding and stamping and fire-fighting evacuation. Accordingly, how to effectively count and disperse an internal flow of people in the subway has become a focus of a rail transit command center network management system. Many intelligent analysis systems have been deployed in recent years, but the following shortcomings still exist.

(1) The current intelligent analysis system occupies high server resources, and at most 16 cameras are accessed at each station for analysis. However, for a subway transfer station that is easy to become crowded, there are about 100 internal cameras, and only 16 cameras being accessed is far from truly reflecting the situation of the passenger flow in the station.

(2) Most of the passenger guidance in the subway station is to broadcast "there are more people in the middle of the train, please go to ends of compartments", and the guidance manner is simple. In the event of an emergency, a large number of passengers are stranded and make the passage congested, and passengers cannot know the subway operation status in advance, so that the manual guidance pressure is great.

(3) Due to the complex internal environment of the subway, a video classification algorithm in the intelligent analysis system usually needs to be designed specifically. Moreover, a professional technician is needed to manually adapt the algorithm and delimit ROI (region of interest) areas when the system is deployed, and selecting cannot be performed automatically, so that more manpower and material resources are required in terms of system deployment.

SUMMARY OF THE INVENTION

It is provided a method for estimating and presenting a passenger flow and a system for estimating and presenting a passenger flow, which can avoid the case that a crowdedness degree inside the subway cannot be monitored in real time and thus the effect of crowd dispersion and guidance is unsatisfactory in the relevant technologies.

An embodiment of the disclosure provides a method for estimating and presenting a passenger flow, which includes:
  receiving on-site video data transmitted by a camera;
  performing two-level scene classification on the on-site video data;
  configuring a passenger flow analysis algorithm corresponding to a scene according to a scene classification result; and
  analyzing a video frame in the on-site video data according to the passenger flow analysis algorithm, outputting a passenger flow calculation result, determining a crowdedness level of the passenger flow at a location corresponding to the camera according to the passenger flow calculation result, and transmitting the crowdedness level of the passenger flow to a first terminal and a second terminal for display of a crowdedness degree of the passenger flow, respectively.

An embodiment of the disclosure also provides a system for estimating and presenting a passenger flow, which includes:
  a video acquiring module, which is configured to acquire and transmit on-site video data to a two-level scene classifying module;
  the two-level scene classifying module, which is configured to perform scene classification on the on-site video data;
  an automatic algorithm configuring module, which is configured to configure a passenger flow analysis algorithm corresponding to a scene according to a scene classification result;
  a passenger flow analyzing module, which is configured to analyze a video frame in the on-site video data according to the passenger flow analysis algorithm, output a passenger flow calculation result, determine a crowdedness level of the passenger flow at a location corresponding to a camera according to the passenger flow calculation result, and transmit the crowdedness level of the passenger flow to a first terminal and a second terminal respectively;
  a first terminal passenger flow displaying module, which is configured to receive the crowdedness level of the passenger flow outputted by the passenger flow analyzing module and perform displaying according to the crowdedness level of the passenger flow; and
  a second terminal passenger flow displaying module, which is configured to receive the crowdedness level of the passenger flow outputted by the passenger flow analyzing module and perform displaying according to the crowdedness level of the passenger flow.

An embodiment of the disclosure further provides a non-transitory computer readable storage medium which stores at least one program, the at least one program being executable by at least one processor so as to implement the above method for estimating and presenting the passenger flow.

DETAILED DESCRIPTION OF THE EMBODIMENTS

In order to facilitate staffs to monitor a crowdedness degree inside the subway in real time so as to perform passage flow dispersion and guidance, embodiments of the disclosure provide a method for estimating and presenting a passenger flow.

Figure 1:
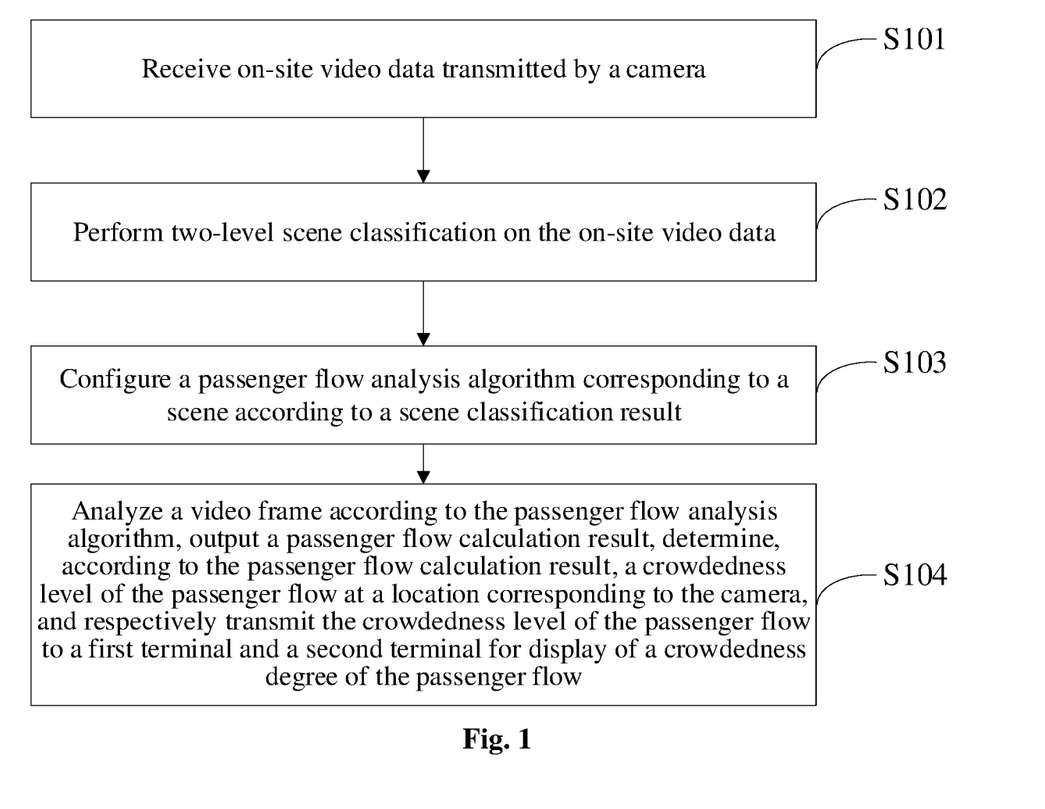
FIG. 1 schematically shows a flowchart of a method for estimating and presenting a passenger flow provided according to an embodiment of the disclosure.

Referring to FIG. 1, there is schematically showed a flowchart of a method for estimating and presenting the passenger flow provided according to an embodiment of the disclosure, which includes steps S101 to S104.

At step S101, on-site video data transmitted by a camera is received.

In the embodiment, the camera is disposed at a front end of a system for estimating and presenting a passenger flow. The camera captures on-site videos throughout the subway station in real time, and transmits on-site video data captured to a two-level scene classifying module.

It should be noted that, the two-level scene classifying module may be disposed at a server of the system for estimating and presenting the passenger flow. In a case where a smart camera is disposed at the front end, the two-level scene classifying module may also be disposed at the front end.

At step S102, two-level scene classification is performed on the on-site video data.

In the embodiment, a strategy of two-level scene classification is used to perform scene classification on the on-site video data captured in real time. Exemplarily, a process of the two-level scene classification in the embodiment is described with reference to FIG. 2, and the process includes steps S201 to S207.

Figure 2:
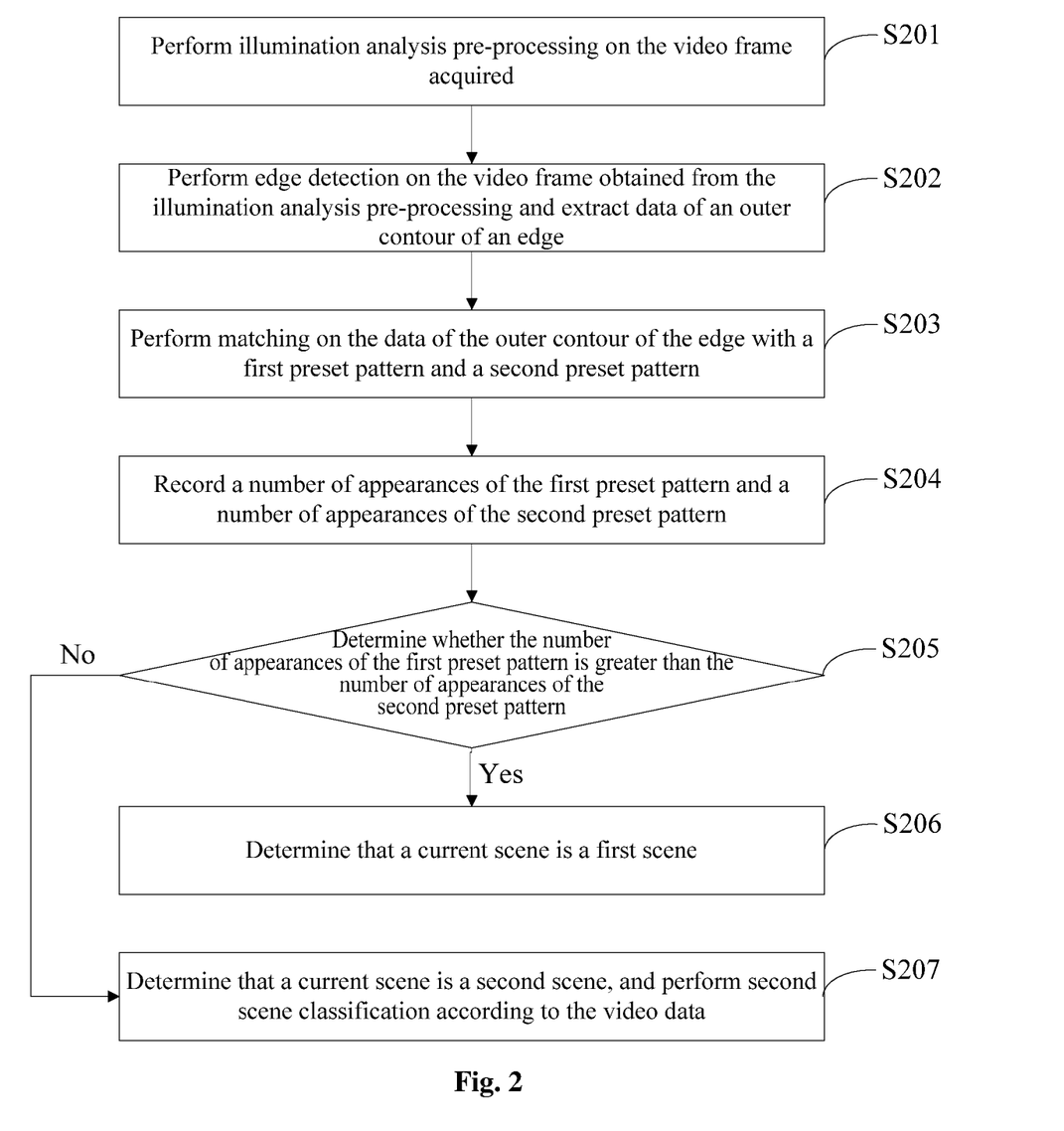
FIG. 2 schematically shows a flowchart of two-level scene classification provided according to an embodiment of the disclosure.

At step S201, illumination analysis pre-processing is performed on a video frame acquired.

It should be understood that, contrast ratios of video frames acquired at different time and/or different sites may be different, and thus it is necessary to perform pre-processing on the video frame, i.e., performing illumination analysis on the video frame. In a case where the contrast ratio of the video frame is lower than a preset contrast ratio, illumination enhancement processing is performed on the video frame, and approaches for such processing include, but are not limited to, algorithms such as histogram equalization and gamma correction; and in a case where the contrast ratio of the video frame is higher than or equal to the preset contrast ratio, no processing is performed on the video frame.

It should be noted that, the video frame mentioned in the embodiment refers to the video frame in the on-site video data. It should be noted that, the preset contrast ratio may be set by the system, and may also be set flexibly according to actual circumstances.

At step S202, edge detection is performed on the video frame obtained from the illumination analysis pre-processing, and data of an outer contour of an edge is extracted.

In the embodiment, the edge detection is performed on the video frame obtained from the illumination analysis pre-processing so as to extract the data of the outer contour of the edge. It should be noted that, performing the edge detection on the video frame which undergoes the illumination analysis pre-processing is mainly to detect an outer contour of an edge of a person in the video frame and extract the data of the outer contour of the edge.

At step S203, matching is performed on the data of the outer contour of the edge with a first preset pattern and a second preset pattern.

In the embodiment, the strategy of the two-level scene classification is used. A first scene classification is mainly used to distinguish a type of the camera. The camera includes, but is not limited to, a top-view camera, a box camera, and so on. It should be understood that, if types of cameras are different and shooting angles are different, video frames acquired would be greatly different in image content. The first preset pattern is an outer contour pattern extracted from an image collected by the top-view camera, and the second preset pattern is an outer contour pattern extracted from an image collected by the box camera. Meanwhile, a template of the first preset pattern and a template of the second preset pattern are set in the system. Scanning is performed on the image from which the data of the outer contour of the edge is extracted based on the template, so that a position of the pattern which matches the first preset pattern and a position of the pattern which matches the second preset pattern in the image can be obtained by matching. For example, most images collected by the top-view camera are images of a top of the head, and a contour of the image of the top of the head usually has a round shape. Most images collected by the box camera are images of an area of a human body, and an outer contour of a head and shoulder part of the human body usually has a Ω shape. Accordingly, by performing scanning and matching on the image based on a template of the round shape and a template of the Ω shape, a position where the round shape is located and a position where the Ω shape is located in the image may be acquired.

At step S204, a number of appearances of the first preset pattern and a number of appearances of the second preset pattern are recorded.

In the embodiment, after a position of the first preset pattern and a position of the second preset pattern in the image are matched, counting and calculation may be performed on a matched result, so as to record the number of appearances of the first preset pattern and the number of appearances of the second preset pattern respectively. For example, a number of appearances of the round shape and a number of appearances of the Ω shape are recorded respectively.

At step S205, determining is performed on whether the number of appearances of the first preset pattern is greater than the number of appearances of the second preset pattern. In a case where the number of appearances of the first preset pattern is greater than the number of appearances of the second preset pattern, the process proceeds to step S206; and in a case where the number of appearances of the second preset pattern is greater than or equal to the number of appearances of the first preset pattern, the process proceeds to step S207.

In the embodiment, by comparing the number of appearances of the first preset pattern and the number of appearances of the second preset pattern, the type of the camera which acquires a current video frame may be determined, i.e. to perform a first scene classification.

At step S206, a current scene is determined to be a first scene.

In the embodiment, the first scene is the video frame acquired by the top-view camera.

At step S207, the current scene is determined to be a second scene, and second scene classification is performed on the video data.

In the embodiment, when it is determined that the current scene is the second scene, it is required to further perform the second scene classification. The second scene may be the video frame acquired by the box camera. A process of the second scene classification in the embodiment is described below with reference to FIG. 3, and the process includes steps S301 to S303.

Figure 3:
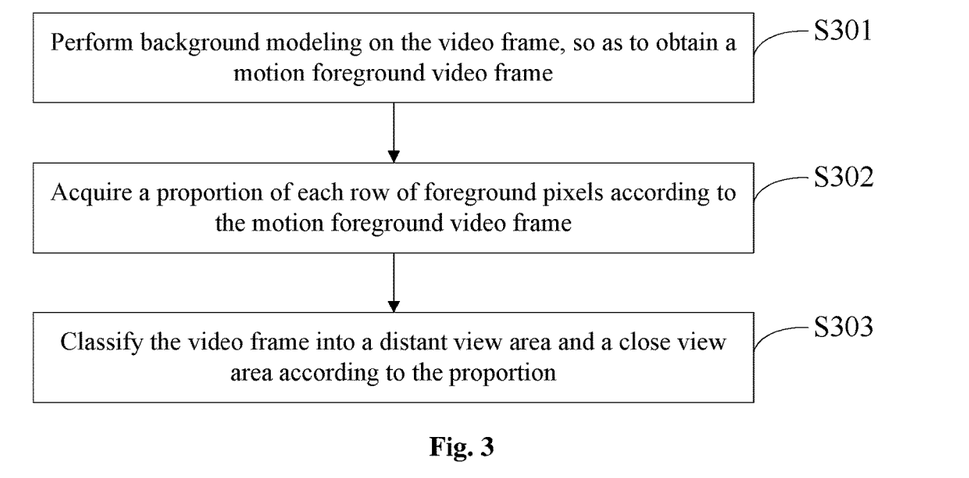
FIG. 3 schematically shows a flowchart of close view and distant view classification provided according to an embodiment of the disclosure.

At step S301, background modeling is performed on the video frame, so as to obtain a motion foreground video frame.

In the embodiment, the background modeling may be performed by using a Gaussian mixture model algorithm, so as to obtain a motion foreground video frame. Exemplarily, a position where a pedestrian is located is marked in the video frame. For example, the position where the pedestrian is located is marked with a white dot. Such an image is called the motion foreground video frame.

At step S302, a proportion of each row of foreground pixels is acquired according to the motion foreground video frame.

In the embodiment, acquiring the proportion of each row of foreground pixels means acquiring a proportion of an area marked with the white dot in each row of pixels in the motion foreground video frame in this row of pixels.

At step S303, the video frame is classified into a distant view area and a close view area according to the proportion.

It should be understood that, the second scene classification is mainly used to classify the distant view area and the close view area in the video frame. For example, in the distant view area, an image of a person in the video frame is relatively small, and the proportion of the area marked with the white dot is low; and in the close view area, an image of a person in the video frame is relatively big, and the proportion of the area marked with the white dot is high. According to this characteristic, in the embodiment, whenever a ratio of a proportion of foreground pixels in a current row to a proportion of foreground pixels in a previous row is greater than or equal to a certain threshold, it may be determined that the current row is a segmenting position of the close view area and the distant view area. It should be noted that, the threshold usually is 0.5.

At step S103, a passenger flow analysis algorithm corresponding to a scene is configured according to a scene classification result.

In the embodiment, after scene classification is completed, the passenger flow analysis algorithm corresponding to the scene is configured according to the scene classification result. In a case where a current scene is the first scene, i.e., the number of appearances of the first preset pattern being greater than the number of appearances of the second preset pattern, it can be determined that a current camera is the top-view camera, and a head top detecting algorithm is configured directly to perform passenger flow analysis; and in a case where the current scene is the second scene, a head-shoulder detecting algorithm is configured for the close view area, and a crowd density estimating algorithm is configured for the distant view.

At step S104, the video frame is analyzed according to the passenger flow analysis algorithm; a passenger flow calculation result is output; a crowdedness level of a passenger flow at a location corresponding to the camera is determined according to the passenger flow calculation result; and the crowdedness level of the passenger flow is transmitted to a first terminal and a second terminal respectively for display of a crowdedness degree of the passenger flow. It should be noted that, in order to reduce system resource occupation, algorithms involved in passenger flow analysis in the embodiment use a base layer characteristic sharing model. The base layer characteristic sharing model is obtained by extracting base layer characteristics using pedestrian re-identification data and training a convolutional neural network using the base layer characteristics. This model may basically characterize basic information of the pedestrian, and different passenger flow analysis algorithms share parameters of this model.

In the embodiment, a result calculated by the head top detecting algorithm may be outputted directly; a second scene classifying module configures two algorithms for the current video frame, i.e., the head-shoulder detecting algorithm and the crowd density estimating algorithm, so as to obtain a first calculation result by performing passenger flow calculation on the close view area using the head-shoulder detecting algorithm and obtain a second calculation result by performing the passenger flow calculation on the distant view area using the crowd density estimating algorithm. A sum of the first calculation result and the second calculation result is calculated, to output a final passenger flow calculation result. The final passenger flow calculation result outputted is a passenger flow calculation result of a location corresponding to a current box camera.

In the embodiment, different passenger flow analysis algorithms share the parameters of the base layer characteristic sharing model, but different passenger flow analysis algorithms are performed in different network layers. For example, differences between the head top detecting algorithm and the head-shoulder detecting algorithm lie in aspect ratios of a detection window, size of the detection window, and characteristics of the detection window. For example, an aspect ratio of a head top detection window is set as 1:1, and the detection window selects shallow characteristics to perform head top detection; while an aspect ratio of a head-shoulder detection window is set as 1:1.5, and the detection window selects shallow characteristics to perform head-shoulder detection.

It should be understood that, in a process of performing passenger flow analysis and calculation with the crowd density estimating algorithm, a down-sampling operation, i.e., reducing the image, is usually performed on the video frame in the on-site video data received to collect crowd characteristic information in the video frame, and crowd density analysis is performed according to the above characteristic information. For the distant view area on which the passenger flow calculation is performed with the crowd density estimating algorithm, it is required to output a density image having the same size as an image input (i.e., the video frame in the on-site video data received). Accordingly, it is required to perform an up-sampling operation, i.e., enlarging the reduced image, on the video frame on which the crowd density analysis is performed, so as to make the size of an outputted result consistent with the image input, thereby outputting a crowd density image. By calculating a sum of numerical values corresponding to multiple points in the density image, density of crowd included in the image input may be obtained, i.e., the second calculation result being obtained.

In the embodiment, after the passenger flow calculation result is outputted, the crowdedness level of the passenger flow at a location corresponding to the camera is determined according to the passenger flow calculation result. Exemplarily, the corresponding crowdedness level of the passenger flow is determined according to a preset threshold. Four levels may be set for crowdedness of the passenger flow, which are respectively severe-crowdedness, medium-crowdedness, slight-crowdedness, and no-crowdedness. Each level has a corresponding preset threshold. The preset threshold may be a range of values. If the passenger flow calculation result outputted falls within a range corresponding to a certain level, the crowdedness degree corresponds to this crowdedness level of the passenger flow. The preset threshold may also be a fixed value. For example, the severe-crowdedness is 50, the medium-crowdedness is 30, the slight-crowdedness is 20, and the no-crowdedness is 10. In a case where the passenger flow calculation result outputted is 15, since 15 is greater than 10 and less than 20, a current degree of the crowdedness level of the passenger flow is the no-crowdedness. In a case where the passenger flow calculation result outputted is 5, since 5 is less than 10, a current degree of the crowdedness level of the passenger flow is the no-crowdedness. For other results, a current degree of the crowdedness level of the passenger flow can be determined in a similar way.

In the embodiment, after the crowdedness level of the passenger flow at the location corresponding to the camera is determined, the result of the crowdedness level of the passenger flow analyzed is transmitted to the first terminal and the second terminal respectively for display of a crowdedness degree of the passenger flow.

It should be noted that the first terminal is a small-screen terminal, and the second terminal is a large-screen terminal. The small-screen terminal may be a smartphone, an iPad, and so on. After an analysis result is received, plotting is performed on areas corresponding to point locations of different cameras on a 2D map according to the crowdedness level of the passenger flow. Different colors are used to perform color filling on traveling paths of the passenger flow. For example, red represents the severe-crowdedness; orange represents the medium-crowdedness; yellow represents the slight-crowdedness; and green represents the no-crowdedness. In this way, an operation and maintenance staff may obtain a real-time video stream of the corresponding point location by clicking a corresponding position on the screen, so that the operation and maintenance staff in the station may know the situation in the station quickly and clearly and may carry out precise guidance for different passages and platforms.

The large-screen terminal may be a display screen for publishing subway information and displays the situation of the passenger flow inside the subway in real time to provide convenience for the passengers, so that the passengers may avoid congested areas by themselves and select a position to get on a train, thereby reducing manual guidance efforts.

According to the method for estimating and presenting the passenger flow provided in the embodiment, two-level scene classification is performed on received on-site video data transmitted by a camera; a passenger flow analysis algorithm corresponding to a scene is configured according to a scene classification result, and different passenger flow analysis algorithms share parameters of a base layer characteristic sharing model; and a video frame is analyzed according to the passenger flow analysis algorithm, a passenger flow calculation result being outputted, a crowdedness level of the passenger flow at a location corresponding to the camera being determined according to the passenger flow calculation result, a result of the crowdedness level of the passenger flow obtained by analyzing being respectively transmitted to a first terminal and a second terminal for display of a crowdedness degree of the passenger flow. Different passenger flow analysis algorithms share parameters of the base layer characteristic sharing model, so that system resource occupation is reduced, the number of cameras that are accessed by the system being increased, meanwhile an overall execution strategy of the analysis algorithms is improved. Moreover, by using a strategy of two-level scene classification, classification of different types of cameras and classification of different areas in one video frame of a respective camera can be realized; and algorithm configuration is performed automatically, so that efforts for manually configuring the system is reduced. By displaying the crowdedness degree of the passenger flow in respective areas in the subway on multiple screens, for an operation and maintenance staff, the situation of the passenger flow in the subway may be provided to the operation and maintenance staff in real time, so that the operation and maintenance staff may know the situation in the station quickly and clearly and may carry out precise guidance for different passages and platforms, thereby improving the guiding efficiency; and for passengers, the passengers may avoid congested areas by themselves and select a position to get on a train, thereby reducing manual guidance efforts.

Figure 4:
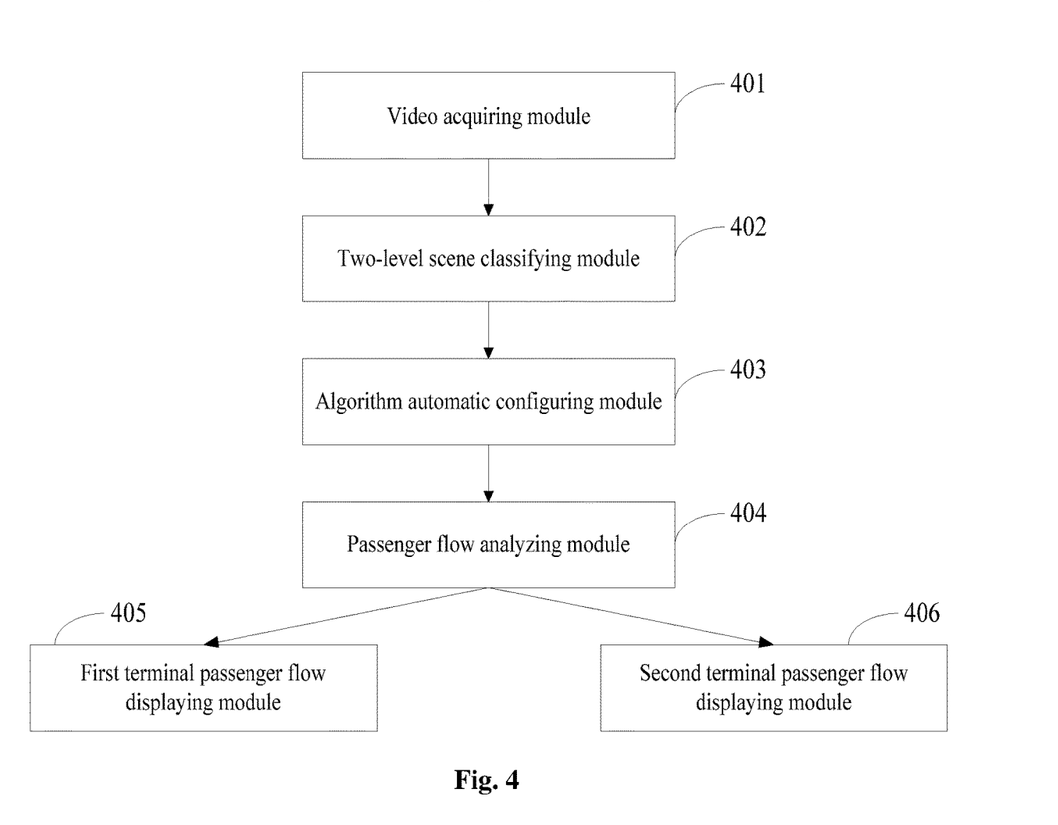
FIG. 4 schematically shows a structure of a system for estimating and presenting a passenger flow provided according to an embodiment of the disclosure.

An embodiment of the disclosure provides a system for estimating and presenting a passenger flow, and this system is used to implement at least one step of the method for estimating and presenting the passenger flow in the above embodiments. Referring to FIG. 4, this system includes a video acquiring module 401, a two-level scene classifying module 402, an automatic algorithm configuring module 403, a passenger flow analyzing module 404, a first terminal passenger flow displaying module 405, and a second terminal passenger flow displaying module 406.

The video acquiring module 401 is configured to acquire and transmit on-site video data to the two-level scene classifying module.

The two-level scene classifying module 402 is configured to perform scene classification on the on-site video data.

It should be noted that, the two-level scene classifying module may be disposed at a server of the system for estimating and presenting the passenger flow. In a case where a smart camera is disposed at a front end of the system for estimating and presenting the passenger flow, the two-level scene classifying module may also be disposed at the front end of the system for estimating and presenting the passenger flow.

The algorithm automatic configuring module 403 is configured to configure a passenger flow analysis algorithm corresponding to a scene according to a scene classification result.

In the embodiment, the passenger flow analysis algorithm is automatically selected by the algorithm automatic configuring module 403 according to the scene classification result. It should be noted that, the algorithm automatic configuring module 403 is located at the server.

The passenger flow analyzing module 404 is configured to analyze the video frame in the on-site video data according to the passenger flow analysis algorithm, outputted a passenger flow calculation result, determine a crowdedness level of the passenger flow at a location corresponding to a camera according to the passenger flow calculation result, and transmit the crowdedness level of the passenger flow to a first terminal and a second terminal respectively.

In the embodiment, four levels may be set for crowdedness of the passenger flow, which are respectively severe-crowdedness, medium-crowdedness, slight-crowdedness, and no-crowdedness. Each level has a corresponding preset threshold. The preset threshold may be a range of values. If the passenger flow calculation result outputted falls within a range corresponding to a certain level, the crowdedness degree corresponds to this crowdedness level of the passenger flow. The preset threshold may also be a fixed value. For example, the severe-crowdedness is 50, the medium-crowdedness is 30, the slight-crowdedness is 20, and the no-crowdedness is 10. In a case where the passenger flow calculation result outputted is 15, since 15 is greater than 10 and less than 20, a current degree of the crowdedness level of the passenger flow is the no-crowdedness. In a case where the passenger flow calculation result outputted is 5, since 5 is less than 10, a current degree of the crowdedness level of the passenger flow is the no-crowdedness. For other results, a current degree of the crowdedness level of the passenger flow can be determined in a similar way.

It should be noted that the passenger flow analyzing module 404 is located at the server.

The first terminal passenger flow displaying module 405 is configured to receive the crowdedness level of the passenger flow outputted by the passenger flow analyzing module 404 and perform displaying according to the crowdedness level of the passenger flow.

In the embodiment, the first terminal is a small-screen terminal. The small-screen terminal may be a smartphone, an iPad, and so on. After an analysis result outputted by the passenger flow analyzing module 404 is received, plotting is performed on areas corresponding to point locations of different cameras on a 2D map according to the crowdedness level of the passenger flow. Different colors are used to perform color filling on traveling paths of the passenger flow. For example, red represents the severe-crowdedness; orange represents the medium-crowdedness; yellow represents the slight-crowdedness; and green represents the no-crowdedness. In this way, an operation and maintenance staff may obtain a real-time video stream of the corresponding point location by clicking a corresponding position on the screen, so that the operation and maintenance staff in the station may know the situation in the station quickly and clearly and may carry out precise guidance for different passages and platforms.

A second terminal passenger flow displaying module 406 is configured to receive the crowdedness level of the passenger flow outputted by the passenger flow analyzing module 404 and perform displaying according to the crowdedness level of the passenger flow.

In the embodiment, the second terminal is a large-screen terminal. The large-screen terminal may be a display screen for publishing subway information and displays the situation of the passenger flow inside the subway in real time to provide convenience for the passengers, so that the passengers may select a traveling path by themselves, avoid congested areas by themselves, and select a position to get on a train, thereby reducing manual guidance efforts.

Figure 5:
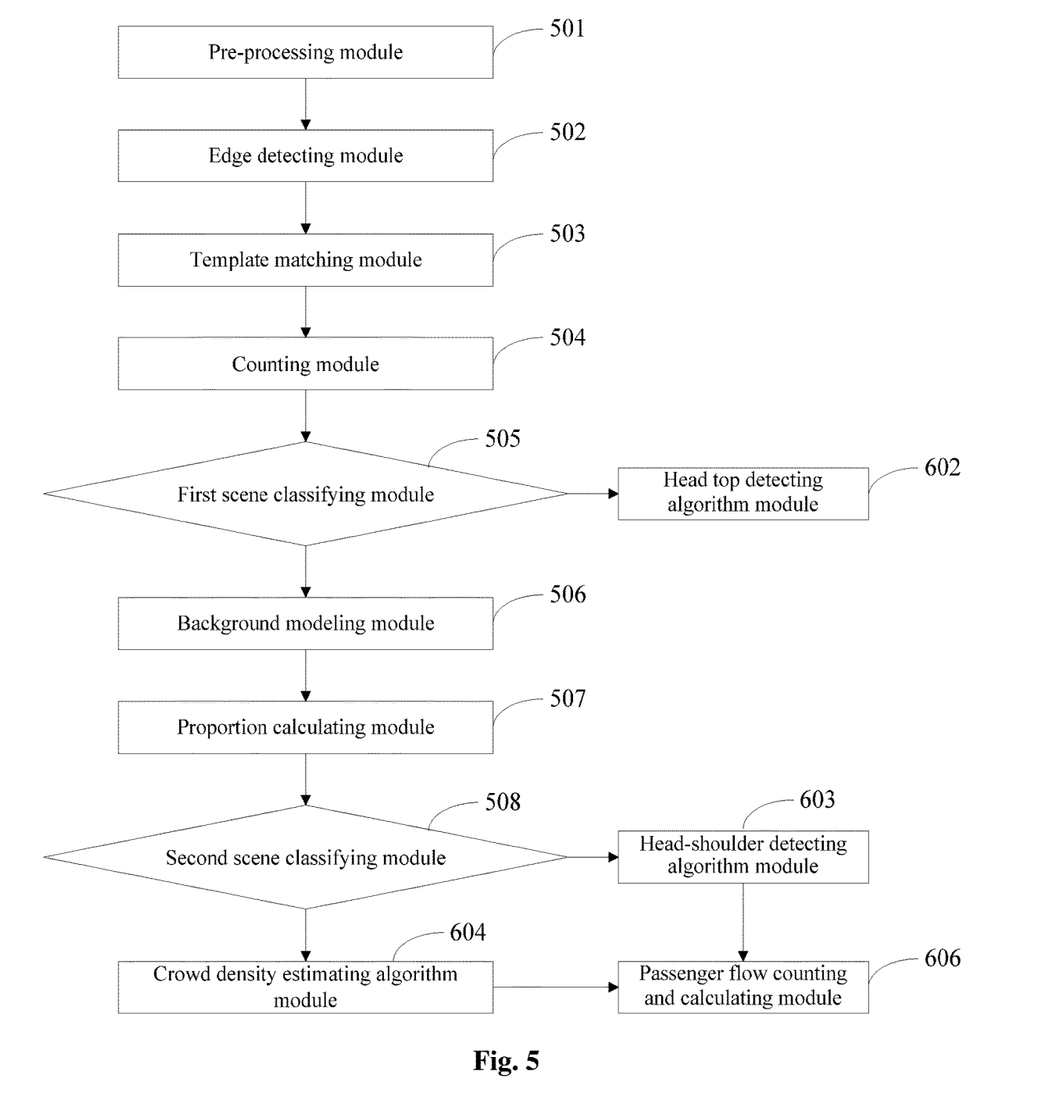
FIG. 5 schematically shows a structure of a two-level scene classifying module provided according to an embodiment of the disclosure.

In the embodiment, a strategy of two-level scene classification is used to realize classification of different types of cameras and classification of different areas in a video frame of the camera, and automatically perform algorithm configuration so as to reduce a workload of manually configuring the system. Exemplarily, FIG. 5 schematically shows a structure of a two-level scene classifying module provided according to an embodiment of the disclosure. Referring to FIG. 5, the two-level scene classifying module 402 further includes a pre-processing module 501, an edge detecting module 502, a template matching module 503, a counting module 504, a first scene classifying module 505, a background modeling module 506, a proportion calculating module 507, and a second scene classifying module 508.

The pre-processing module 501 is configured to perform illumination analysis pre-processing on the video frame acquired.

It should be understood that, contrast ratios of video frames acquired at different time and/or different sites may be different, and thus it is necessary to perform pre-processing on the video frame, i.e., performing illumination analysis on the video frame. In a case where the contrast ratio of the video frame is lower than a preset contrast ratio, illumination enhancement processing is performed on the video frame, and approaches for such processing include, but are not limited to, algorithms such as histogram equalization and gamma correction; and in a case where the contrast ratio of the video frame is higher than or equal to the preset contrast ratio, no processing is performed on the video frame.

It should be noted that, the preset contrast ratio may be set by the system, and may also be set flexibly according to actual circumstances.

The edge detecting module 502 is configured to perform edge detection on the video frame obtained from the illumination analysis pre-processing and extract data of an outer contour of an edge.

The template matching module 503 is configured to perform matching on the data of the outer contour of the edge extracted with a first preset pattern and a second preset pattern.

In the embodiment, the strategy of the two-level scene classification is used. The first scene classifying module 505 described below is mainly used to distinguish a type of the camera. The camera includes, but is not limited to, a top-view camera, a box camera, and so on. It should be understood that, if types of cameras are different and shooting angles are different, video frames acquired would be greatly different in image content. The first preset pattern is an outer contour pattern extracted from an image collected by the top-view camera, and the second preset pattern is an outer contour pattern extracted from an image collected by the box camera. Meanwhile, a template of the first preset pattern and a template of the second preset pattern are set in the system. Scanning is performed on the image from which the data of the outer contour of the edge is extracted based on the template, so that a position of the pattern which matches the first preset pattern and a position of the pattern which matches the second preset pattern in the image can be obtained by matching. For example, most images collected by the top-view camera are images of a top of the head, and a contour of the image of the top of the head usually has a round shape. Most images collected by the box camera are images of an area of a human body, and an outer contour of a head and shoulder part of the human body usually has a Ω shape. Accordingly, by performing scanning and matching on the image based on a template of the round shape and a template of the Ω shape, a position where the round shape is located and a position where the Ω shape is located in the image may be acquired.

The counting module 504 is configured to perform calculation and counting on a matched result, so as to record a number of appearances of the first preset pattern and a number of appearances of the second preset pattern.

In the embodiment, after a position of the first preset pattern and a position of the second preset pattern in the image are matched by the template matching module 503, the counting module 504 performs counting and calculation on the matched result, so as to record the number of appearances of the first preset pattern and the number of appearances of the second preset pattern respectively. For example, the number of appearances of the round shape and the number of appearances of the Ω shape are recorded respectively.

The first scene classifying module 505 is configured to receive the number of appearances of the first preset pattern and the number of appearances of the second preset pattern outputted by the counting module 504. In a case where the number of appearances of the first preset pattern is greater than the number of appearances of the second preset pattern, a current scene is a first scene; and in a case where the number of appearances of the second preset pattern is greater than or equal to the number of appearances of the first preset pattern, a current scene is a second scene, and second scene classification is further performed on the video data.

In the embodiment, in a case where the current scene is the second scene, the second scene classification is further performed on the video data. Exemplarily, the background modeling module 506 is configured to perform background modeling on the video frame, so as to obtain a motion foreground video frame.

In the embodiment, the background modeling may be performed by using a mixed Gaussian model algorithm, so as to obtain a motion foreground video frame. Exemplarily, a position where a pedestrian is located is marked in the video frame. For example, the position where the pedestrian is located is marked with a white dot. Such an image is called the motion foreground video frame.

The proportion calculating module 507 is configured to receive the motion foreground video frame, so as to acquire a proportion of each row of foreground pixels.

In the embodiment, acquiring the proportion of each row of foreground pixels means acquiring a proportion of an area marked with the white dot in each row of pixels in the motion foreground video frame in this row of pixels.

The second scene classifying module 508 is configured to classify the video frame into a distant view area and a close view area according to the proportion.

It should be understood that, the second scene classification is mainly used to classify the distant view area and the close view area in the video frame. For example, in the distant view area, an image of a person in the video frame is relatively small, and the proportion of the area marked with the white dot is low; and in the close view area, an image of a person in the video frame is relatively big, and the proportion of the area marked with the white dot is high. According to this characteristic, the embodiment, whenever a ratio of a proportion of foreground pixels in a current row to a proportion of foreground pixels in a previous row is greater than or equal to a certain threshold, it may be determined that the current row is a segmenting position of the close view area and the distant view area. It should be noted that, the threshold usually is 0.5.

In order to reduce system resource occupation, algorithms involved in passenger flow analysis in the embodiment use a base layer characteristic sharing model, and different passenger flow analysis algorithms share parameters of this model.

Figure 6:
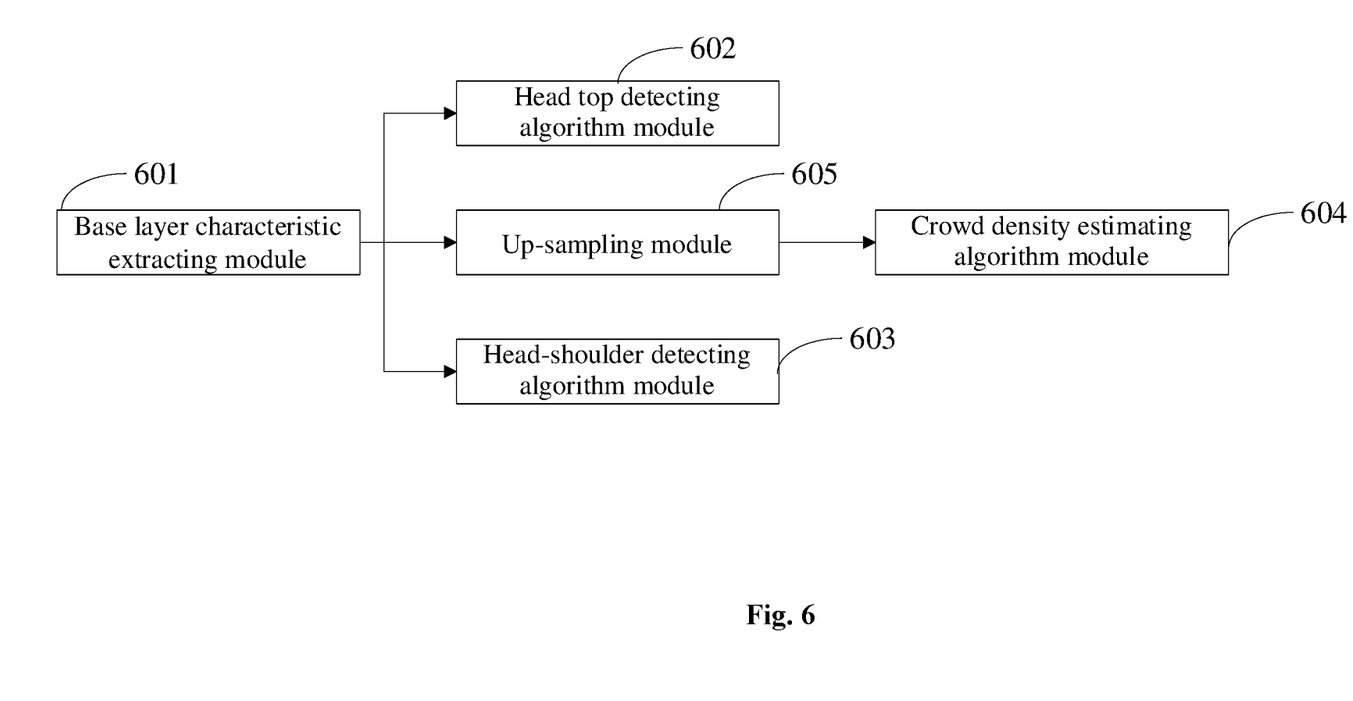
FIG. 6 schematically shows a structure of a base layer characteristic sharing model.

Referring to FIG. 5 and FIG. 6, the base layer characteristic sharing model includes a base layer characteristic extracting module 601, a head top detecting algorithm module 602, a head-shoulder detecting algorithm module 603, a crowd density estimating algorithm module 604, an up-sampling module 605, and a passenger flow counting and calculating module 606.

The base layer characteristic extracting module 601 is configured to extract base layer characteristics using pedestrian re-identification data and train a convolutional neural network using the base layer characteristics to obtain a base layer characteristic sharing model. Herein, the base layer characteristic sharing model is used to characterize basic information of the pedestrian.

The head top detecting algorithm module 602 is configured to calculate the passenger flow and output a result of passenger flow calculation.

In the embodiment, in a case where the current scene is the first scene, it may be determined that the current camera is the top-view camera, and the algorithm automatic configuring module 403 directly configures a head top detecting algorithm to perform passenger flow analysis. The head top detecting algorithm is implemented in the head top detecting algorithm module 602. After the passenger flow calculation is completed, the result of the passenger flow calculation is outputted.

The head-shoulder detecting algorithm module 603 is configured to perform passenger flow calculation on the close view area, so as to obtain a first calculation result.

In the embodiment, in a case where the current scene is the second scene, the second scene classification is performed on the video data. The second scene classification is mainly used to classify the distant view area and the close view area in the video frame. After the distant view area and the close view area are classified, the algorithm automatic configuring module 403 configures a head-shoulder detecting algorithm for the close view area to perform the passenger flow calculation so as to obtain the first calculation result.

The up-sampling module 605 is configured to execute an up-sampling operation, so that a size of a video frame outputted by the up-sampling module 605 is the same as a size of a video frame in the on-site video data received by the video acquiring module.

In the embodiment, in a case where the current scene is the second scene and is the distant view area, in a process of performing passenger flow analysis and calculation with a crowd density estimating algorithm, a down-sampling operation, i.e., reducing the image, is usually performed on the video frame in the on-site video data input to collect crowd characteristic information in the video frame, and crowd density analysis is performed according to the above characteristic information. For the distant view area on which the passenger flow calculation is performed with the crowd density estimating algorithm, it is required to output a density image having the same size as an image input (i.e., the video frame in the on-site video data received). Accordingly, it is required to perform the up-sampling operation, i.e., enlarging the reduced image, on the video frame on which the crowd density analysis is performed, so as to make the size of an outputted result consistent with the image input.

The crowd density estimating algorithm module 604 is configured to perform passenger flow calculation on the distant view area to output a crowd density image and calculate a sum of numerical values corresponding to multiple points in the crowd density image so as to obtain a second calculation result.

The passenger flow counting and calculating module 606 is configured to receive the first calculation result outputted by the head-shoulder detecting algorithm module and the second calculation result outputted by the crowd density estimating algorithm module, and calculate a sum of the first calculation result and the second calculation result so as to output a final result of the passenger flow calculation.

It should be noted that, in the embodiment, different passenger flow analysis algorithms share the parameters of the base layer characteristic sharing model, but different passenger flow analysis algorithms are performed in different network layers. For example, the head top detecting algorithm module 602 and the head-shoulder detecting algorithm module 603 respectively perform head top detecting and head-shoulder detecting in different network layers in the base layer characteristic sharing model. Differences between the head top detecting algorithm module and the head-shoulder detecting algorithm module lie in aspect ratios of a detection window, size of the detection window, and characteristics of the detection window. For example, an aspect ratio of a head top detection window is set as 1:1, and the detection window selects shallow characteristics to perform head top detection; while an aspect ratio of a head-shoulder detection window is set as 1:1.5, and the detection window selects shallow characteristics to perform head-shoulder detection.

According to the system for estimating and presenting the passenger flow provided in the embodiment, two-level scene classification is performed on received on-site video data captured in real time transmitted by a video acquiring module of a camera; a passenger flow analysis algorithm corresponding to a scene is configured according to a scene classification result, and different passenger flow analysis algorithms share parameters of a base layer characteristic sharing model; and a video frame is analyzed according to the passenger flow analysis algorithm, a passenger flow calculation result being outputted, a crowdedness level of the passenger flow at a location corresponding to the camera being determined according to a preset threshold, a result obtained by analyzing being respectively transmitted to a first terminal and a second terminal for display of a crowdedness degree of the passenger flow. Different passenger flow analysis algorithms share parameters of the base layer characteristic sharing model, so that system resource occupation is reduced, the number of cameras that are accessed by the system being increased, meanwhile an overall execution strategy of the analysis algorithms is being improved. Moreover, by using a strategy of two-level scene classification, classification of different types of the camera and classification of different areas in one video frame of the camera can be realized; and algorithm configuration is performed automatically, so that efforts for manually configuring the system is reduced. By displaying the crowdedness degree of the passenger flow in respective areas in the subway on multiple screens, for an operation and maintenance staff, the situation of the passenger flow in the subway may be provided to the operation and maintenance staff in real time, so that the operation and maintenance staff may know the situation in the station quickly and clearly and may carry out precise guidance for different passages and platforms, thereby improving the guiding efficiency; and for passengers, the passengers may avoid congested areas by themselves and select a position to get on a train, thereby reducing manual guidance efforts.

An embodiment of the disclosure further provides a non-transitory computer readable storage medium. The non-transitory computer readable storage medium includes volatile and non-volatile, removable and non-removable mediums that may be implemented in any method or technology for storing information (such as a computer readable instruction, a data structure, and a computer program module or other data). The non-transitory computer readable storage medium includes, but is not limited to, an RAM (random access memory), an ROM (read-only memory), an EEPROM (electrically erasable programmable read only memory), a flash memory or other memory technology, a CD-ROM (compact disc read-only memory), a digital video disk (DVD) or other optical disk storage, a magnetic cassette, a magnetic tape, a magnetic disk storage or other magnetic storage device, or any other medium which can be used to store desired information and can be accessed by a computer.

The non-transitory computer readable storage medium in the embodiment may be configured to store at least one computer program. Herein, the at least one computer program stored may be executed by at least one processor, so as to implement at least one step of the method for estimating and presenting the passenger flow described in the above embodiment.

It should be understood that, in some circumstances, the at least one step illustrated or described may be implemented in a sequence different from the sequence described in the above embodiment.

As can be seen, those skilled in the art should understand that, all or some steps of the method and functional modules/units of the system disclosed above may be implemented as software (which may be implemented with computer program codes executable by a computing device), firmware, hardware, and a proper combination thereof. In an embodiment of the hardware, a division of the functional modules/units mentioned in the above description does not necessarily correspond to a division of physical components. For example, one physical component may have multiple functions, or one function or step may be implemented by multiple physical components cooperatively. Some physical components or all physical components may be implemented as software executed by a processor, such as a central processor, a digital signal processor or a microprocessor, or may be implemented as hardware, or may be implemented as an integrated circuit, such as an disclosure-specific integrated circuit.

Besides, it is well known to a person of ordinary skills in the art that the communication medium typically includes a computer readable instruction, a data structure, a computer program module, or other data in a modulated data signal, such as a carrier wave or other transport mechanisms, and may include any information delivery medium. Accordingly, the disclosure is not limited to a combination of any particular hardware and software.

According to the method for estimating and presenting the passenger flow, the system for estimating and presenting the passenger flow, and the computer storage medium provided in embodiments of the disclosure, two-level scene classification is performed on received on-site video data transmitted by a camera; a passenger flow analysis algorithm corresponding to a scene is configured according to a scene classification result; and a video frame in the on-site video data is analyzed according to the passenger flow analysis algorithm, a passenger flow calculation result being outputted, a crowdedness level of the passenger flow at a location corresponding to the camera being determined according to the passenger flow calculation result, the crowdedness level of the passenger flow being respectively transmitted to a first terminal and a second terminal for display of a crowdedness degree of the passenger flow. By means of the method for estimating and presenting the passenger flow, the system for estimating and presenting the passenger flow, and the computer storage medium provided in the disclosure, the crowdedness degree of a crowd in the subway can be monitored in real time, so as to effectively perform crowd dispersion and guidance.

What is claimed is:

1. A method for estimating and presenting a passenger flow, comprising:
   receiving on-site video data transmitted by a camera;
   performing two-level scene classification on the on-site video data;
   configuring a passenger flow analysis algorithm corresponding to a scene according to a scene classification result; and
   analyzing a video frame in the on-site video data according to the passenger flow analysis algorithm, outputting a passenger flow calculation result, determining, according to the passenger flow calculation result, a crowdedness level of the passenger flow at a location corresponding to the camera, and respectively transmitting the crowdedness level of the passenger flow to a first terminal and a second terminal for display of a crowdedness degree of the passenger flow,
   wherein performing the two-level scene classification on the on-site video data comprises:
   performing illumination analysis pre-processing on the video frame acquired;
   performing edge detection on the video frame obtained from the illumination analysis pre-processing and extracting data of an outer contour of an edge;
   performing matching on the data of the outer contour of the edge with a first preset pattern and a second preset pattern;
   recording a number of appearances of the first preset pattern and a number of appearances of the second preset pattern;
   determining that a current scene is a first scene in a case where the number of appearances of the first preset pattern is greater than the number of appearances of the second preset pattern; and
   determining that a current scene is a second scene in a case where the number of appearances of the second preset pattern is greater than or equal to the number of appearances of the first preset pattern, and performing second scene classification on the on-site video data.

2. The method according to claim 1, wherein performing the second scene classification on the on-site video data comprises:
   performing background modeling on the video frame, so as to obtain a motion foreground video frame;
   acquiring a proportion of each row of foreground pixels according to the motion foreground video frame; and
   classifying the video frame into a distant view area and a close view area according to the proportion.

3. The method according to claim 1, wherein in a case where the current scene is the first scene, the passenger flow analysis algorithm corresponding to the scene is a head top detecting algorithm.

4. The method according to claim 2, wherein configuring the passenger flow analysis algorithm corresponding to the scene according to the scene classification result comprises:
   configuring a head-shoulder detecting algorithm for the close view area; and
   configuring a crowd density estimating algorithm for the distant view area.

5. The method according to claim 3, wherein analyzing the video frame according to the passenger flow analysis algorithm and outputting the passenger flow calculation result comprises:
   performing calculation on the passenger flow using the head top detecting algorithm, and
   outputting the passenger flow calculation result.

6. The method according to claim 4, wherein analyzing the video frame according to the passenger flow analysis algorithm and outputting the passenger flow calculation result comprises:
   performing passenger flow calculation on the close view area using the head-shoulder detecting algorithm, so as to obtain a first calculation result;
   performing passenger flow calculation on the distant view area using the crowd density estimating algorithm, so as obtain a second calculation result;
   calculating a sum of the first calculation result and the second calculation result so as to obtain a final result of the passenger flow calculation.

7. The method according to claim 6, wherein performing the passenger flow calculation on the distant view area using the crowd density estimating algorithm so as obtain the second calculation result comprises:
   performing a down-sampling operation on the video frame to collect crowd characteristic information in the video frame;
   performing crowd density analysis according to the characteristic information;
   perform an up-sampling operation on the video frame on which the crowd density analysis is performed to output a crowd density map and obtain a second calculation result.

8. The method according to claim 1, wherein the passenger flow analysis algorithm uses a base layer characteristic sharing model to perform passenger flow calculation,
   the base layer characteristic sharing model is configured to:
   extract base layer characteristics using pedestrian re-identification data and train a convolutional neural network using the base layer characteristics to obtain a base layer characteristic sharing model, wherein the base layer characteristic sharing model is used to characterize basic information of a pedestrian;
   calculate the passenger flow and output a result of passenger flow calculation;
   perform passenger flow calculation on the close view area, so as to obtain a first calculation result;
   execute an up-sampling operation, so that a size of a video frame outputted is the same as a size of a video frame in the on-site video data;
   perform passenger flow calculation on the distant view area to output a crowd density image and calculate a sum of numerical values corresponding to multiple points in the crowd density image so as to obtain a second calculation result; and
   receive the first calculation result and the second calculation result, and calculate a sum of the first calculation result and the second calculation result so as to output a final result of the passenger flow calculation.

9. A non-transitory computer readable storage medium, which stores at least one computer program, wherein the at least one computer program is executable by at least one processor so as to implement the method for estimating and presenting the passenger flow according to claim 1.

10. The method according to claim 1, wherein the passenger flow analysis algorithm uses a base layer characteristic sharing model to perform passenger flow calculation,
the base layer characteristic sharing model is configured to:
extract base layer characteristics using pedestrian re-identification data and train a convolutional neural network using the base layer characteristics to obtain a base layer characteristic sharing model, wherein the base layer characteristic sharing model is used to characterize basic information of a pedestrian;
calculate the passenger flow and output a result of passenger flow calculation;
perform passenger flow calculation on the close view area, so as to obtain a first calculation result;
execute an up-sampling operation, so that a size of a video frame outputted is the same as a size of a video frame in the on-site video data;
perform passenger flow calculation on the distant view area to output a crowd density image and calculate a sum of numerical values corresponding to multiple points in the crowd density image so as to obtain a second calculation result; and
receive the first calculation result and the second calculation result, and calculate a sum of the first calculation result and the second calculation result so as to output a final result of the passenger flow calculation.

11. The method according to claim 2, wherein the passenger flow analysis algorithm uses a base layer characteristic sharing model to perform passenger flow calculation,
the base layer characteristic sharing model is configured to:
extract base layer characteristics using pedestrian re-identification data and train a convolutional neural network using the base layer characteristics to obtain a base layer characteristic sharing model, wherein the base layer characteristic sharing model is used to characterize basic information of a pedestrian;
calculate the passenger flow and output a result of passenger flow calculation;
perform passenger flow calculation on the close view area, so as to obtain a first calculation result;
execute an up-sampling operation, so that a size of a video frame outputted is the same as a size of a video frame in the on-site video data;
perform passenger flow calculation on the distant view area to output a crowd density image and calculate a sum of numerical values corresponding to multiple points in the crowd density image so as to obtain a second calculation result; and
receive the first calculation result and the second calculation result, and calculate a sum of the first calculation result and the second calculation result so as to output a final result of the passenger flow calculation.

12. The method according to claim 3, wherein the passenger flow analysis algorithm uses a base layer characteristic sharing model to perform passenger flow calculation,
the base layer characteristic sharing model is configured to:
extract base layer characteristics using pedestrian re-identification data and train a convolutional neural network using the base layer characteristics to obtain a base layer characteristic sharing model, wherein the base layer characteristic sharing model is used to characterize basic information of a pedestrian;
calculate the passenger flow and output a result of passenger flow calculation;
perform passenger flow calculation on the close view area, so as to obtain a first calculation result;
execute an up-sampling operation, so that a size of a video frame outputted is the same as a size of a video frame in the on-site video data;
perform passenger flow calculation on the distant view area to output a crowd density image and calculate a sum of numerical values corresponding to multiple points in the crowd density image so as to obtain a second calculation result; and
receive the first calculation result and the second calculation result, and calculate a sum of the first calculation result and the second calculation result so as to output a final result of the passenger flow calculation.

13. The method according to claim 4, wherein the passenger flow analysis algorithm uses a base layer characteristic sharing model to perform passenger flow calculation,
the base layer characteristic sharing model is configured to:
extract base layer characteristics using pedestrian re-identification data and train a convolutional neural network using the base layer characteristics to obtain a base layer characteristic sharing model, wherein the base layer characteristic sharing model is used to characterize basic information of a pedestrian;
calculate the passenger flow and output a result of passenger flow calculation;
perform passenger flow calculation on the close view area, so as to obtain a first calculation result;
execute an up-sampling operation, so that a size of a video frame outputted is the same as a size of a video frame in the on-site video data;
perform passenger flow calculation on the distant view area to output a crowd density image and calculate a sum of numerical values corresponding to multiple points in the crowd density image so as to obtain a second calculation result; and
receive the first calculation result and the second calculation result, and calculate a sum of the first calculation result and the second calculation result so as to output a final result of the passenger flow calculation.

14. The method according to claim 5, wherein the passenger flow analysis algorithm uses a base layer characteristic sharing model to perform passenger flow calculation,
the base layer characteristic sharing model is configured to:
extract base layer characteristics using pedestrian re-identification data and train a convolutional neural network using the base layer characteristics to obtain a base layer characteristic sharing model, wherein the base layer characteristic sharing model is used to characterize basic information of a pedestrian;
calculate the passenger flow and output a result of passenger flow calculation;
perform passenger flow calculation on the close view area, so as to obtain a first calculation result;
execute an up-sampling operation, so that a size of a video frame outputted is the same as a size of a video frame in the on-site video data;
perform passenger flow calculation on the distant view area to output a crowd density image and calculate a sum of numerical values corresponding to multiple points in the crowd density image so as to obtain a second calculation result; and receive the first calculation result and the second calculation result, and calculate a sum of the first calculation result and the second calculation result so as to output a final result of the passenger flow calculation.

15. The method according to claim 6, wherein the passenger flow analysis algorithm uses a base layer characteristic sharing model to perform passenger flow calculation, the base layer characteristic sharing model is configured to:

extract base layer characteristics using pedestrian re-identification data and train a convolutional neural network using the base layer characteristics to obtain a base layer characteristic sharing model, wherein the base layer characteristic sharing model is used to characterize basic information of a pedestrian;

calculate the passenger flow and output a result of passenger flow calculation;

perform passenger flow calculation on the close view area, so as to obtain a first calculation result;

execute an up-sampling operation, so that a size of a video frame outputted is the same as a size of a video frame in the on-site video data;

perform passenger flow calculation on the distant view area to output a crowd density image and calculate a sum of numerical values corresponding to multiple points in the crowd density image so as to obtain a second calculation result; and receive the first calculation result and the second calculation result, and calculate a sum of the first calculation result and the second calculation result so as to output a final result of the passenger flow calculation.

16. The method according to claim 7, wherein the passenger flow analysis algorithm uses a base layer characteristic sharing model to perform passenger flow calculation, the base layer characteristic sharing model is configured to:

extract base layer characteristics using pedestrian re-identification data and train a convolutional neural network using the base layer characteristics to obtain a base layer characteristic sharing model, wherein the base layer characteristic sharing model is used to characterize basic information of a pedestrian;

calculate the passenger flow and output a result of passenger flow calculation;

perform passenger flow calculation on the close view area, so as to obtain a first calculation result;

execute an up-sampling operation, so that a size of a video frame outputted is the same as a size of a video frame in the on-site video data;

perform passenger flow calculation on the distant view area to output a crowd density image and calculate a sum of numerical values corresponding to multiple points in the crowd density image so as to obtain a second calculation result; and receive the first calculation result and the second calculation result, and calculate a sum of the first calculation result and the second calculation result so as to output a final result of the passenger flow calculation.

\* \* \* \* \*